United States Patent
Knubben

(10) Patent No.: US 11,273,424 B2
(45) Date of Patent: Mar. 15, 2022

(54) CATALYST UNLOADING OF TUBULAR REACTORS

(71) Applicant: Mourik International B.V., Botlek-Rotterdam (NL)

(72) Inventor: Petrus Knubben, Leiden (NL)

(73) Assignee: Mourik International B.V., Botlek-Rotterdam (NL)

(*) Notice: Subject to any disclaimer, the term of this patent is extended or adjusted under 35 U.S.C. 154(b) by 312 days.

(21) Appl. No.: 16/316,062

(22) PCT Filed: Jul. 6, 2017

(86) PCT No.: PCT/EP2017/067035
§ 371 (c)(1),
(2) Date: Jan. 8, 2019

(87) PCT Pub. No.: WO2018/007564
PCT Pub. Date: Jan. 11, 2018

(65) Prior Publication Data
US 2019/0247816 A1    Aug. 15, 2019

(30) Foreign Application Priority Data
Jul. 8, 2016  (NL) ..................... 2017136

(51) Int. Cl.
*B01J 8/00* (2006.01)
*B01J 8/06* (2006.01)
*B08B 9/032* (2006.01)
*B08B 9/035* (2006.01)

(52) U.S. Cl.
CPC ............. *B01J 8/0035* (2013.01); *B01J 8/002* (2013.01); *B01J 8/003* (2013.01); *B01J 8/004* (2013.01); *B01J 8/06* (2013.01); *B08B 9/035* (2013.01); *B08B 9/0321* (2013.01); *B01J 2208/00761* (2013.01)

(58) Field of Classification Search
CPC ........ B01J 8/0015; B01J 8/002; B01J 8/0025; B01J 8/003; B01J 8/0035; B01J 8/004; B01J 8/06; B01J 2208/00752; B01J 2208/00761; B01J 2208/00769
See application file for complete search history.

(56) References Cited

U.S. PATENT DOCUMENTS

| 6,182,716 B1 | 2/2001 | Fry |
| 6,360,786 B1 | 3/2002 | Fry |
| 2012/0237412 A1* | 9/2012 | Johns ...................... B01J 8/067 422/219 |

\* cited by examiner

*Primary Examiner* — Lessanework Seifu
(74) *Attorney, Agent, or Firm* — Hoyng Rokh Monegier B.V.; David P. Owen

(57) ABSTRACT

Embodiments of the invention are directed to a device and a method for unloading particulate material from a reactor tube of a catalytic reactor comprising an array of substantially vertically aligned reactor tubes. The device comprises an air lance (11, 111-113) for loosening the particulate material inside the reactor tube using pressurized air, an air lance unit (10) for feeding the air lance in and out of the reactor tube, and a flexible guide tube (12, 121-123) on one end connectable to the air lance unit and on the other end connectable to a cleaned reactor tube (7, 71-73) for guiding the air lance from the reactor tube to the cleaned reactor tube for storing a part of the air lance that has not been fed into the reactor tube within the first cleaned reactor tube.

16 Claims, 9 Drawing Sheets

CATALYST UNLOADING OF TUBULAR REACTORS

CROSS REFERENCE TO RELATED APPLICATIONS

This application is a 371 of PCT application number PCT/EP2017/067035 filed on Jul. 6, 2017, which claims priority from NL application number NL2017136 filed on Jul. 8, 2016. All applications are hereby incorporated by reference in their entireties.

TECHNICAL FIELD

The invention relates to catalyst unloading of tubular reactors. More specifically, the invention relates to removing catalyst from tubes of a catalyst reactor using air lances.

BACKGROUND ART

Chemicals are often manufactured on an industrial scale by reaction in large industrial catalytic reactors. A type of industrial catalytic reactor often used is provided with a multitude of vertically arranged, parallel reactor tubes partially or fully filled with catalyst particles during operation. Chemical reactants are passed through the reactor tubes to contact the catalyst for reaction. Such reactors are often referred to as multi-tube reactors and are used for the production of e.g. ethylene oxide, methyl acrylate, acrylic acid, phthalic anhydride, maleic anhydride, acetylene, aromatics, mono styrene propylene oxide or gas to liquid products.

Typical catalytic reactors are cylindrical with a diameter in the region of 2 to 9 meters and a height in the region of 5 to 50 meters. Catalytic reactors are usually bespoke structures designed for particular chemical processes or site requirements and hence individual reactors can vary greatly in their dimensions. In principle, such a reactor can be of any size, and in particular can be bigger or smaller than the typical sizes given above, the limitations being associated with physical construction limits and reaction requirements. There has been a general trend in the last years, particularly in the petrochemical industry, to increase catalytic reactor sizes.

The reactor is normally provided with a cylindrical shell containing a large number of vertically aligned, parallel reactor tubes; anywhere from 500 to 40000. The reactor tubes have upper and lower ends that are joined e.g. welded, to openings in upper and lower tube sheets. The tube sheets extend horizontally in the cylindrical shell and are normally located adjacent end flanges thereof. The upper and lower ends of the reactor shell are closed off by domes that can be opened to permit internal access for servicing and catalyst replacement in the reactor tubes. For example, the domes may be provided with manholes to allow worker access or may be removable. Oftentimes domes are non-removable, or at least not conveniently removable, because cooling pipes are run through the dome into the reactor core. These cooling pipes can make it complicated or impossible to remove the dome of the reactor.

The reactor tubes are open at their ends and can have inner diameters from in the region of about 2 to 15 cm. They are joined (e.g. by welding), to a pattern of openings provided in the tube sheets. The number of tubes and pattern of openings in the tube sheets is appropriate to the chemical reaction and scale of reaction that is carried out in the reactor, but normally the openings are equally spaced with a, preferably constant, pitch (i.e. the shortest distance between the outer periphery of one hole and the outer periphery of its neighbor hole) of from 0.3 to 5 cm or more.

Catalyst particles are loaded into the reactor tubes. Catalyst particles are provided in a variety of sizes and shapes, typically spherical or cylindrical, and have nominal diameters in the range of from about 1 mm to 25 mm, more normally in the range of 2 to 15 mm. The reactor tubes and catalyst pellets are matched in size to allow for the particles to enter the reactor tubes in a controlled manner that minimizes bridging risks. Typically the particles have a maximum dimension of from 0.1 to 0.8 times the reactor tube inner diameter, more normally from 0.15 to 0.6, and more normally 0.25 to 0.4.

Used catalyst particles may be unloaded from the reactor tubes using air lancing, which uses a combination of pressurized air and vacuum. With air lancing catalyst particles are "loosened" with the pressurized air and vacuum removed. Following catalyst removal the tubes can be dedusted, inspected and, if necessary, cleaned. Known unloading techniques include top vacuuming using a fluidization system, physical removal by prodding of thermocouple tubes and/or fused catalyst, and water jetting in the event that tubes are completely blocked. In the event that the reactor internals have to be cleaned to remove corrosion, polymers or other foulants, the tubes may be wire brushed using a flexible, rotating shaft with specific brush attachments that is lowered into the tubes, pigged for cleaning individual tubes using cylindrical abrasive objects followed by a foam-ball to remove dust, or grit blasted when the internals are dirty due to fused catalyst or polymers.

Unloading catalyst is a labor intensive, time consuming and therefore costly operation, involving a group of trained personnel inserting air lances into the tubes from the top sheet of the reactor. There is a need for a more efficient unloading method, wherein the number of personnel and the time needed for unloading is minimized.

SUMMARY OF INVENTION

The invention enables particulate material, such as used catalyst particles, to be removed from reactor tubes in a labor and time efficient manner.

According to an aspect of the invention a device is proposed for unloading particulate material from a reactor tube of a catalytic reactor. The catalytic reactor typically comprises an array of substantially vertically aligned reactor tubes. The device can comprise an air lance for loosening the particulate material inside the reactor tube using pressurized air. The device can further comprise an air lance unit for feeding the air lance in and out of the reactor tube. The device can further comprise a flexible guide tube that is on one end connectable to the air lance unit and on the other end to a first cleaned reactor tube. The flexible guide tube is arranged for guiding the air lance from the reactor tube to the first cleaned reactor tube thereby enabling a part of the air lance that has not been fed into the reactor tube to be stored within the first cleaned reactor tube. The cleaned reactor tube is a reactor tube that has been unloaded and/or cleaned prior to the unloading of the reactor tube 6, possibly using any known unloading and/or cleaning method.

Advantageously, the air lance unit can be used for feeding the air lance in and out of the reactor tube, thereby eliminating the need for trained personnel to do this job. The air lance unit may detect obstructions in the reactor tube from detected resistance when feeding the air lance into the reactor tube, allowing the air lance unit to adjust the feeding force, adjust the air pressure of the pressurized air (including the possibility of stopping the air flow), adjust the vacuuming force (including the possibility of shutting down the vacuum system) and/or stop the unloading for one or more of the reactor tubes. Thus, the unloading procedure can be further automated. The part of the air lance that has not been fed into the reactor tube is advantageously stored in an already cleaned reactor tube, resulting, together with the flexible guide tube, in the tube sheet to be free from air lance parts. As a result multiple sections of the tube sheet may be processed at once by multiple air lance units for cleaning even more reactor tubes simultaneously. Also, a tube sheet clean of air lance parts may be subjected to other activities, such as cleaning or inspecting of tubes, while reactor tubes are being unloaded.

The embodiment of claim 2 advantageously enables the loosened particles to be vacuumed away using the same air lance unit as used for feeding the air lance. As a result the space needed on the tube sheet for unloading the particulate material can be minimized.

The embodiment of claim 3 advantageously enables one or more flexible guide tubes to be connected to the cleaned reactor tubes more easily. The first connector device may be adapted to the specific dimensions and connection possibilities of the reactor tubes, while the part connecting to the flexible guide tube is always the same. This allows the flexible guide tube to be the same for all catalytic reactors.

The embodiment of claim 5 advantageously increases the safety of the device by securing e.g. the pressurized parts of the device at the cleaned reactor tubes in case parts break loose.

The embodiment of claim 6 advantageously enables the air lance to be provided with pressurized air via the cleaned reactor tube, thereby eliminating the need for a pump at the top sheet and thus saving space at the top sheet for unloading or other activities.

The embodiment of claim 7 advantageously enables multiple reactor tubes to be cleaned simultaneously, thereby saving time to unload the reactor tubes. Moreover, the air lance unit can be operated by a single person, resulting in multiple reactor tubes to be unloadable simultaneously by a single person. The number of personnel required for unloading the reactor tubes is therefore minimized as well.

The embodiment of claim 8 advantageously enables the air lance unit and first connector device to be compact and thus easier to handle.

The embodiment of claim 9 advantageously enables the air lance unit to be held in place by gravity, i.e. without or with limited fixation to the tube sheet or reactor tubes.

According to an aspect of the invention an air lance unit is proposed having one or more of the above mentioned features and advantages.

According to an aspect of the invention a method is proposed for unloading particulate material from a reactor tube of a catalytic reactor using a device having one or more of the above mentioned features and advantages. The method can comprise feeding the air lance from the first cleaned reactor tube into the reactor tube while the air lance unit is placed over the reactor tube. The method can further comprise feeding the air lance from the reactor tube to the first cleaned reactor tube while the air lance unit is placed over the reactor tube. The method can further comprise moving the air lance unit resulting in the air lance unit to be placed over a further reactor tube from which particulate material is to be unloaded. The method can further comprise feeding the air lance from the first cleaned reactor tube into the further reactor tube while the air lance unit is placed over the further reactor tube. The method can further comprise feeding the air lance from the further reactor tube to the first cleaned reactor tube while the air lance unit is placed over the further reactor tube. The cleaned reactor tube is a reactor tube that has been unloaded and/or cleaned prior to the unloading of the reactor tube 6, possibly using any known unloading and/or cleaning method.

Advantageously, the method can be used for subsequently unloading reactor tubes at different locations on the tube sheet using the same air lance unit. Because the same cleaned reactor tubes can be used for storing the air lances, minimal personnel involvement is required when moving the air lance unit, i.e. the main task to be performed is moving the air lance unit.

The embodiment of claim 12 advantageously enables the reactor tubes to be unloaded and the cleaned reactor tubes to be located at an optimal distance allowing the flexible guide tube to remain connected to the cleaned tubes while the air lance unit is movable to most or all reactor tubes to be cleaned in its section.

The embodiment of claim 13 advantageously enables reactor tubes in a substantially circular tube sheets to be unloaded in an efficient way.

The embodiment of claim 14 advantageously enables application of multiple air lance units simultaneously for quicker unloading of all of the reactor tubes in the tube sheet.

Hereinafter, embodiments of the invention will be described in further detail. It should be appreciated, however, that these embodiments may not be construed as limiting the scope of protection for the present invention.

BRIEF DESCRIPTION OF DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

Figure 1:
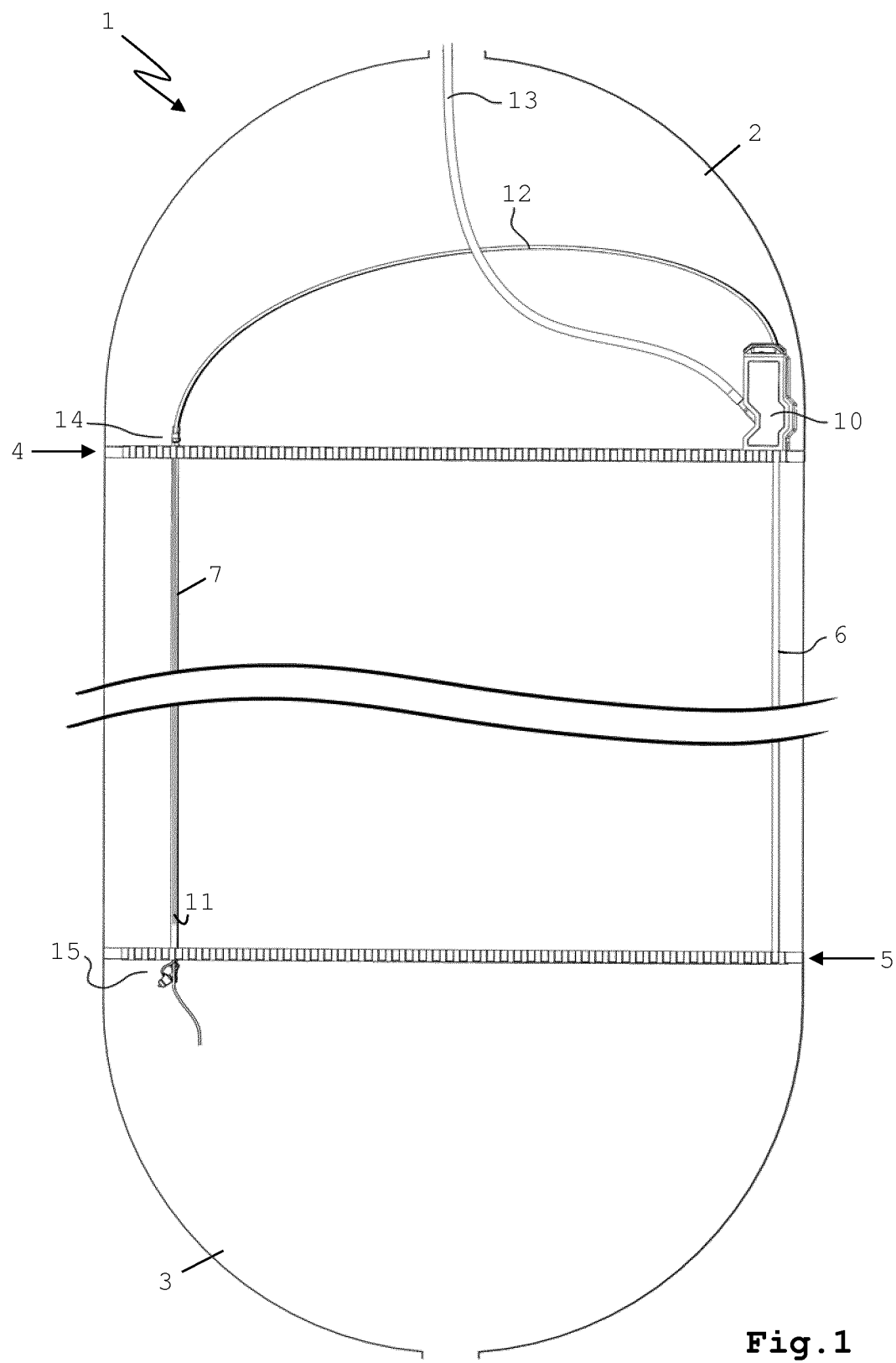
FIGS. 1 and 2 show a side view of a catalytic reactor.

FIG. 1 shows a side view of an exemplary catalytic reactor 1 having an upper dome 2, a lower dome 3 and a multitude of reactor tubes between an upper tube sheet 4 and a lower tube sheet 5. In FIG. 1 only two reactor tubes 6 and 7 are shown, but in fact there is a large number of vertically aligned, parallel reactor tubes; typically anywhere from 500 to 40000, but any other number of reactor tubes is possible. The multitude of reactor tubes is depicted by the tube ends drawn in the upper and lower tube sheets.

When particulate material, such as used catalyst particles, is to be unloaded from the reactor tubes, access is gained to the upper dome 2 and unloading equipment is installed on the upper tube sheet 4. According to the present invention, a movable air lance unit 10 is installed on the upper tube sheet on top of a reactor tube 6 that is to be unloaded and/or cleaned. The air lance unit 10 feeds an air lance 11 into the reactor tube 6 for loosening the catalyst particles at the tip of the air lance 11 using pressurized air supplied to the air lance 11. The loosened catalyst particles are then removed from the reactor tube 6 by vacuuming the particles through vacuum hose 13 that is on one end connected to the air lance unit 10 for this purpose. The other end of the vacuum hose 13 is typically connected to a vacuum system located outside of the upper dome 2 (not shown in FIG. 1).

Figure 2:
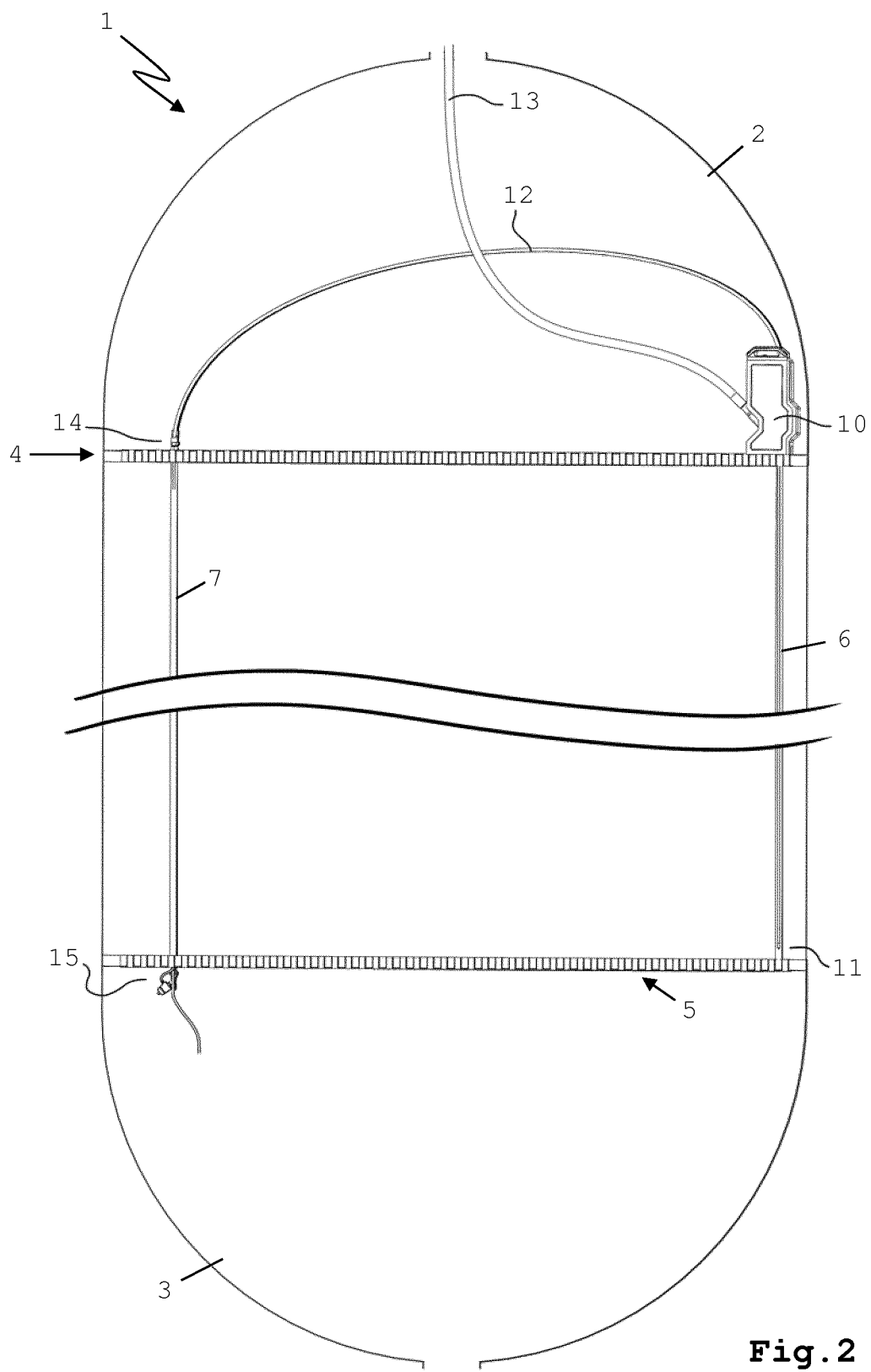

While the catalyst particles are being unloaded from the reactor tube 6, the air lance 11 is lowered into the reactor tube 6 for loosening the remaining catalyst particles, until the bottom particles in the reactor tube 6 have been reached near or at the lower tube sheet 5. This is illustrated by FIGS. 1 and 2, wherein in FIG. 1 the air lance 11 has not been inserted into reactor tube 6 yet or has been removed from the reactor tube 6, and wherein in FIG. 2 the air lance 11 reached the lower end of the reactor tube 6.

To avoid working space on the upper sheet 4 to be wasted by the part of the air lance that is not inserted into the reactor tube 6, a flexible guide tube 12 is connected to the air lance unit 10 for guiding the air lance 11 to a cleaned reactor tube 7. The cleaned reactor tube 7 is a reactor tube that has been unloaded and/or cleaned prior to the unloading of the reactor tube 6, possibly using any known unloading and/or cleaning method. The cleaned reactor tube 7 acts as a temporary storage of the part of the air lance 11 that has not been inserted into the reactor tube 6. Again this is illustrated by FIGS. 1 and 2, wherein in FIG. 1 the air lance 11 is stored in the cleaned reactor tube 7, and wherein in FIG. 2 the air lance 11 is almost completely removed from the cleaned reactor tube 7.

Figure 6:
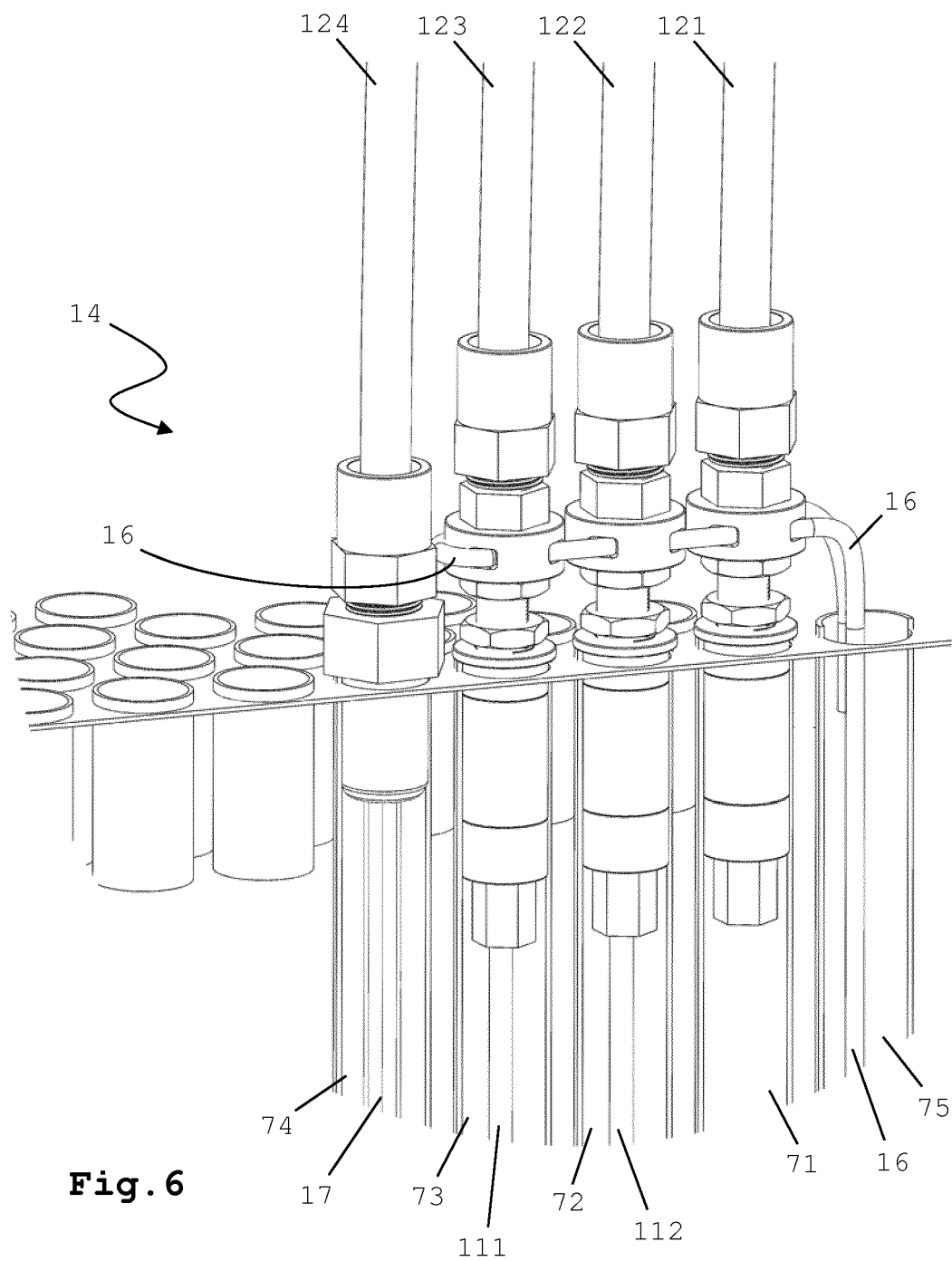
FIG. 6 shows a perspective view of a first connector device installed on a tube sheet.

The flexible guide tube 12 may be fixed to the top end of the cleaned reactor tube 7 via a first connector device 14, for example as shown in FIG. 6.

At the bottom end a second connector device 15 may be fixed to the cleaned reactor tube 7. The first and second connector devices may thus create an air tight sealing of the cleaned reactor tube 7 allowing pressurized air to be supplied to the cleaned reactor tube 7 via the second connector device and thus to the air lance 11 within the cleaned reactor tube 7. In case the air lance 11 has been inserted into the reactor tube 6 to such extend that the air lance 11 is fully extracted from the cleaned tube 7, the pressurized air may be provided to the air lance 11 via the cleaned reactor tube 7 and the flexible guide tube 12.

Figure 3:
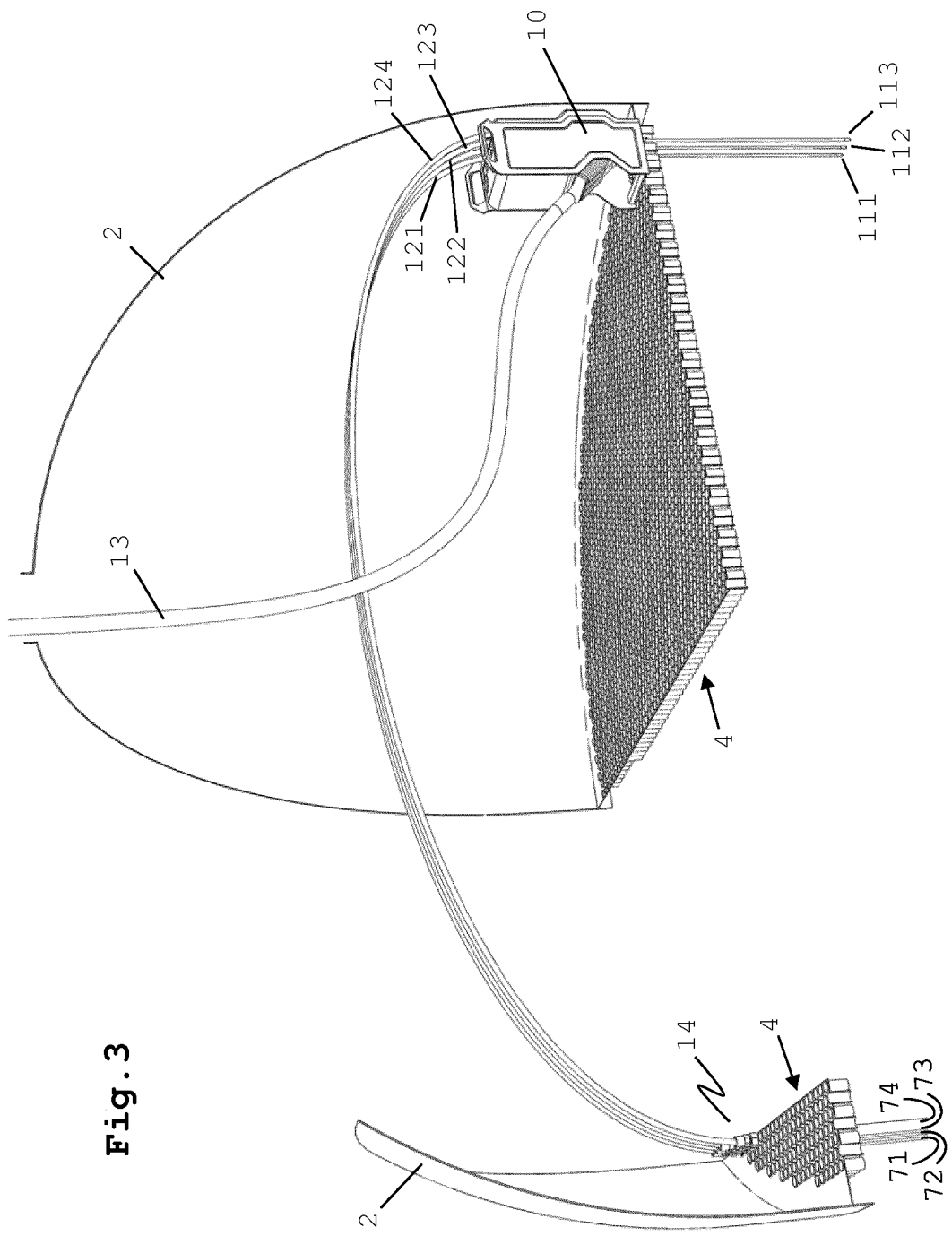
FIGS. 3 and 4 show a perspective view of a section of a top part of a catalytic reactor.

FIG. 3 shows a perspective view of a section of the upper part of the catalytic reactor 1. Only a part of the upper tube sheet 4 is shown, i.e. one quarter with an air lance unit 10 placed thereon and a small portion including clean reactor tubes 71-74. The upper tube sheet 4 of FIG. 3 is to be understood to include non shown parts and to be circularly shaped. The upper tube sheet 4 is shown with a multitude of tube ends. The parts of the reactor tubes below the upper tube sheet 4 are not shown in FIG. 3. In the embodiment of FIG. 3 the air lance unit 10 is used for simultaneously unloading catalyst particles from three reactor tubes using three air lances 111, 112, 113. The air lances 111, 112, 113 are guided from the air lance unit 10 to three cleaned reactor tubes 71, 72, 73, one for each air lance, via three flexible guide tubes 121, 122, 123.

Figure 8:
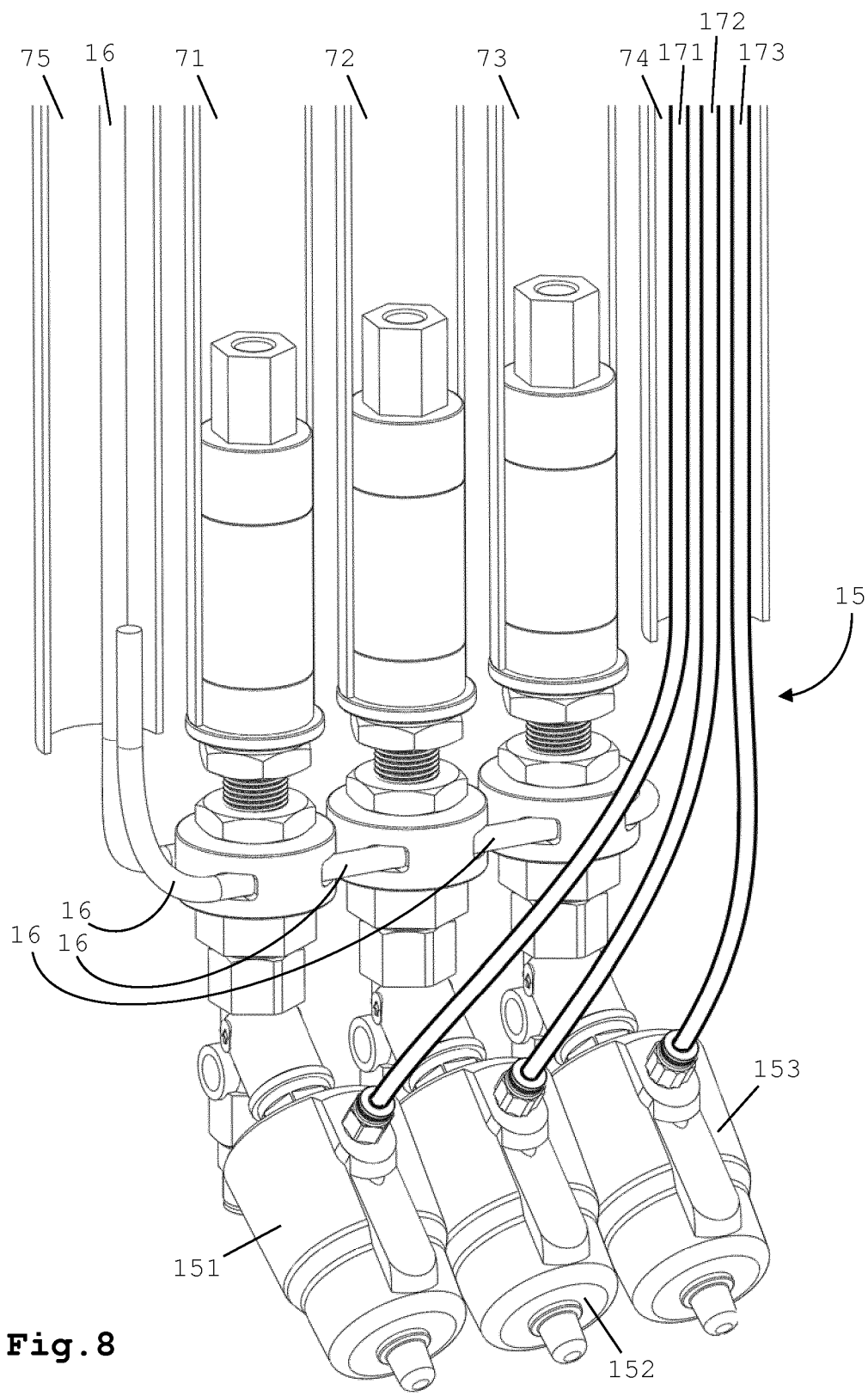
FIG. 8 shows a perspective view of a second connector device fixed installed on tubes.

Also shown in FIG. 3 is a fourth flexible guide tube 124, which may connect the air lance unit 10 to a fourth cleaned reactor tube 74 for guiding a control conduit from the air lance unit 10 to the second connector device 15 for controlling the pressurized air supply, as further explained with FIGS. 6 and 8.

Figure 4:
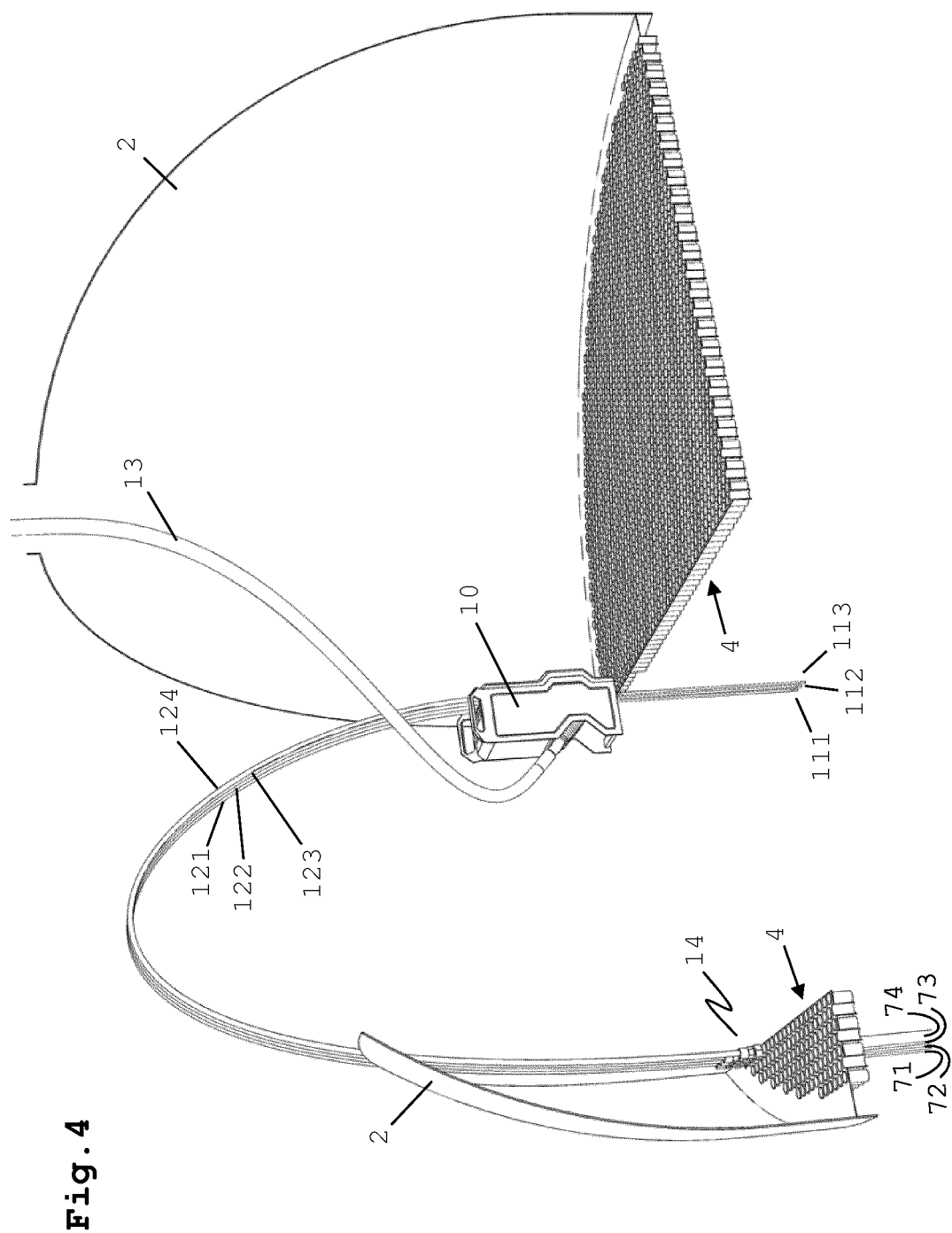

The air lance unit 10 is designed such that it may be moved on the upper tube sheet 4. Hereto, for example two handles are provided on the air lance unit 10 as shown in FIG. 3, allowing the unit to be picked up and placed over a further to be unloaded reactor tube or further to be unloaded reactor tubes in case of unloading multiple reactor tubes simultaneously. The flexibility of the guide tubes 12, 121-124 and the flexibility of the air lances 11, 111-113 allow the guide tubes to bend when the air lance unit 10 is moved. Similarly, the vacuum hose 13 follows the movement of the air lance unit 10. While the air lance unit 10 is moved, the flexible guide tubes 12, 121-124 typically remain fixed to the cleaned reactor tubes 7, 71-74. FIG. 4 shows the air lance unit 10 of FIG. 3 after moving the unit to another location, resulting in the flexible guide tubes to follow a sharper bend. In case the height of the upper dome 2 is lower than the height of the arced flexible guide tubes, the guide tubes may be pushed to a side by the inner surface of the upper dome 2.

To aid a person in correctly placing the air lance unit 10 over the reactor tubes 6 to be cleaned, the air lance unit 10 may be provided with a laser guide system. When turned on, the laser guide system projects a laser line onto the tube sheet from two opposite sides of the air lance unit 10. Thus, the two laser lines, e.g. to the left and the right of the air lance unit 10, form a virtual straight line crossing the air lance unit 10. When the laser line is aligned with tube ends to the left and the right of the air lance unit 10, the air lance unit is correctly aligned over the reactor tubes 6 to be unloaded. Further laser guide lines may be projected from the air lance unit into different directions.

Figure 5:
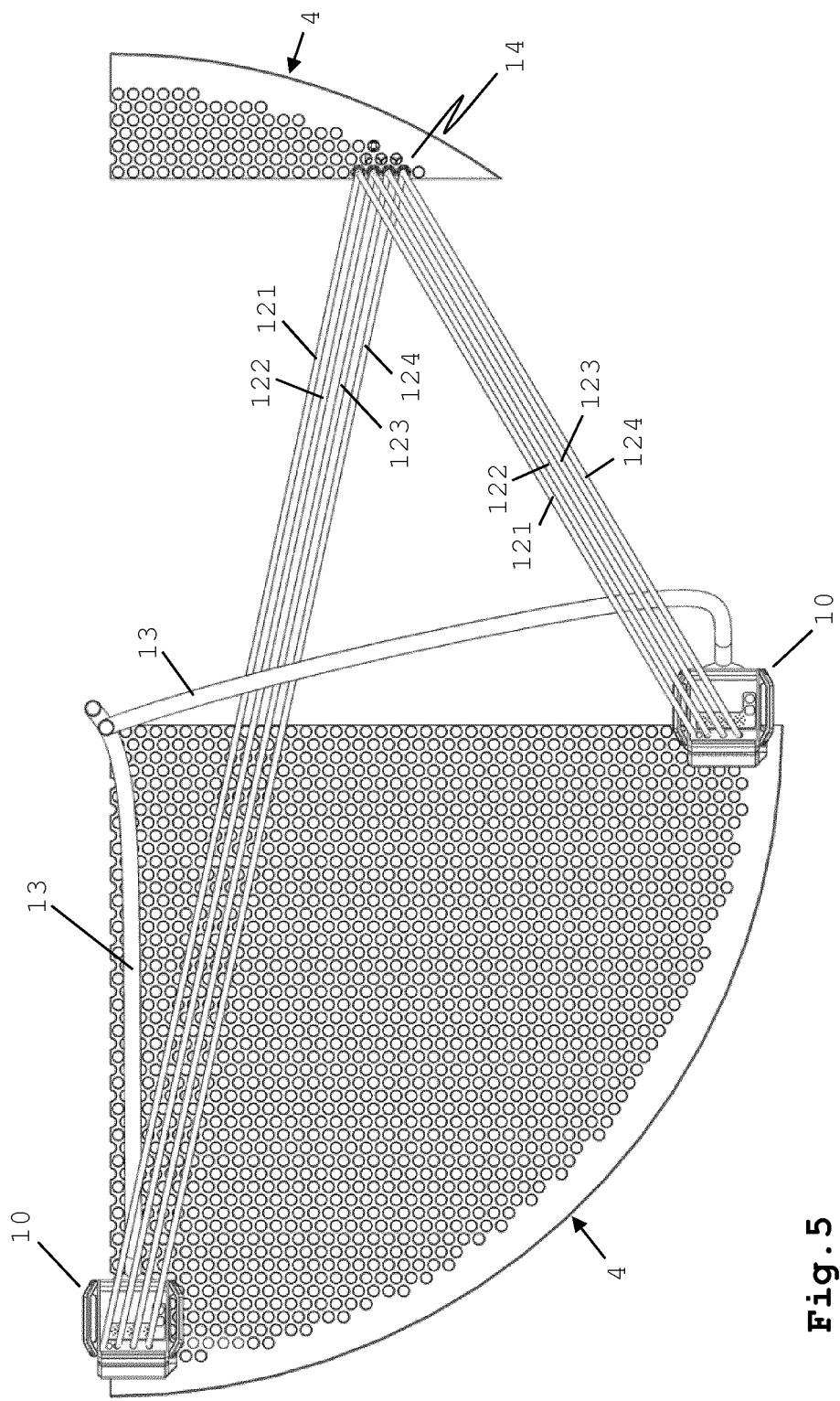
FIG. 5 shows a top view of a section of a tube sheet of a catalytic reactor.

FIG. 5 shows a top view of the upper tube sheet 4 with the air lance unit 10 being located in the two locations of FIG. 3 (top left position in FIG. 5) and FIG. 4 (bottom position in FIG. 5). FIG. 5 is to be understood to show a single air lance unit 10 in two different positions. FIG. 5 shows that the flexible guide tubes 121-124 remain fixed to the cleaned reactor tubes 71-74 (typically via a first connector device 14) when the air lance unit 10 is moved.

The upper tube sheet 4 may be divided into multiple sections, for example in quadrants. Each section may be processed by a single air lance unit, while multiple sections are processed at the same time. In the example of FIG. 5 one quadrant is shown that is processed by a single air lance unit 10. At the same time another quadrant may be processed using another air lance unit and for example using other cleaned reactor tubes in the same quadrant as reactor tubes 71-74. Other variants of processing multiple sections at the same time are possible, e.g. one wherein reactor tubes that are cleaned by air lance unit 10 are used as cleaned reactor tubes for another air lance unit in another section, while the air lance unit 10 is still working on its section. More than two section may be processed at once, e.g. three or all four quadrants may each be processed by an air lance unit using cleaned reactor tubes in an opposite quadrant.

Figure 7:
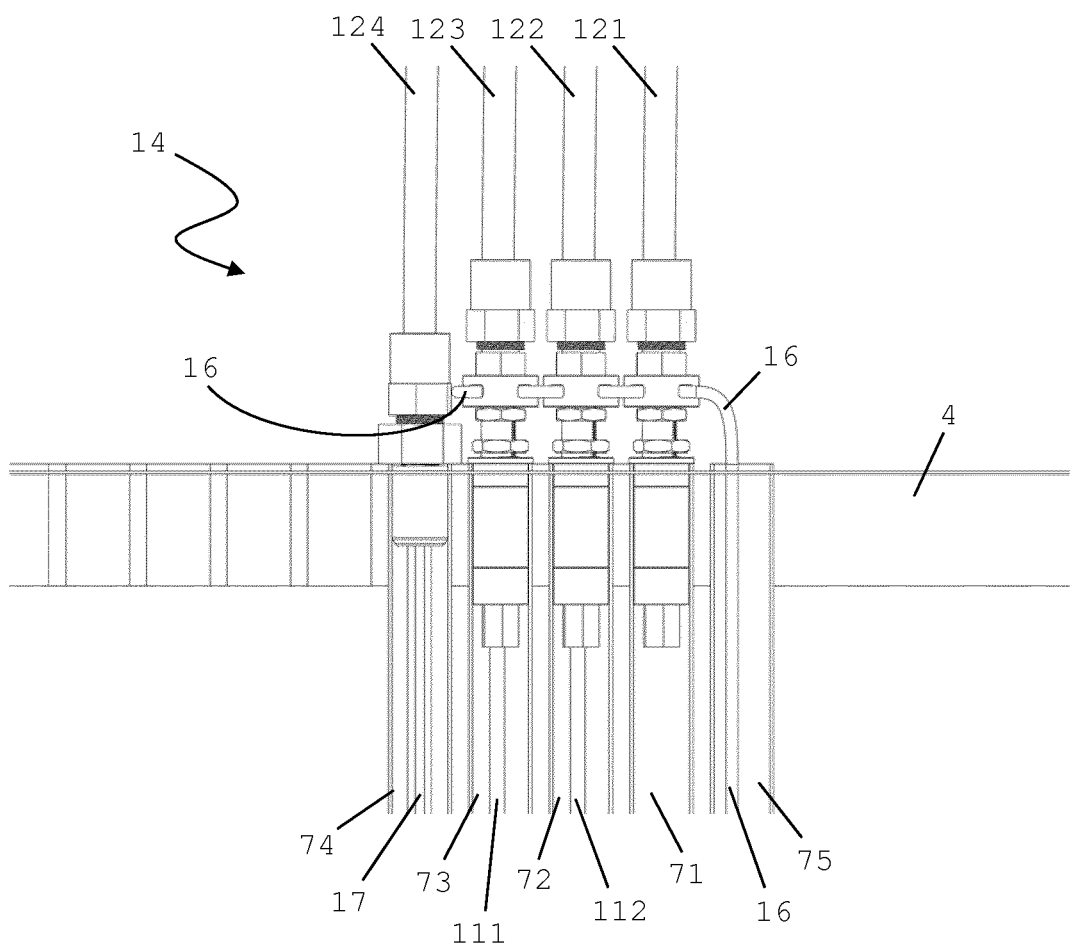
FIG. 7 shows a side view of a first connector device installed on a tube sheet.

An exemplary embodiment of a first connector device 14 is shown in FIGS. 6 and 7, FIG. 6 being a perspective view and FIG. 7 being a side view. In this example the first connector device 14 is used to connect three flexible guide tubes 121-123 to three cleaned reactor tubes 71-73. The first connector device 14 may include an insertion part that is inserted into the tube and which is fixed to a threaded tube end using nuts for each of the tubes. Alternatively, any other known connection mechanism for tube ends may be used. On the other end of the insertion part the flexible guide tubes 121-123 may be connected using any known connection mechanism, e.g. using air sealing nuts as shown in FIG. 6.

A fourth flexible guide tube 124 may be connected to a fourth cleaned reactor tube 74 for guiding a control conduit 17 from the air lance unit 10 to the second connector device 15 (see also FIG. 8). The control conduit 17 is for example a pneumatic conduit, allowing the air lance unit 10 to control a valve at the second connector device 15. Another non limiting example is an electrical conduit for transmitting control signals or voltages from the air lance unit to a valve at the second connector device 15.

Figure 9:
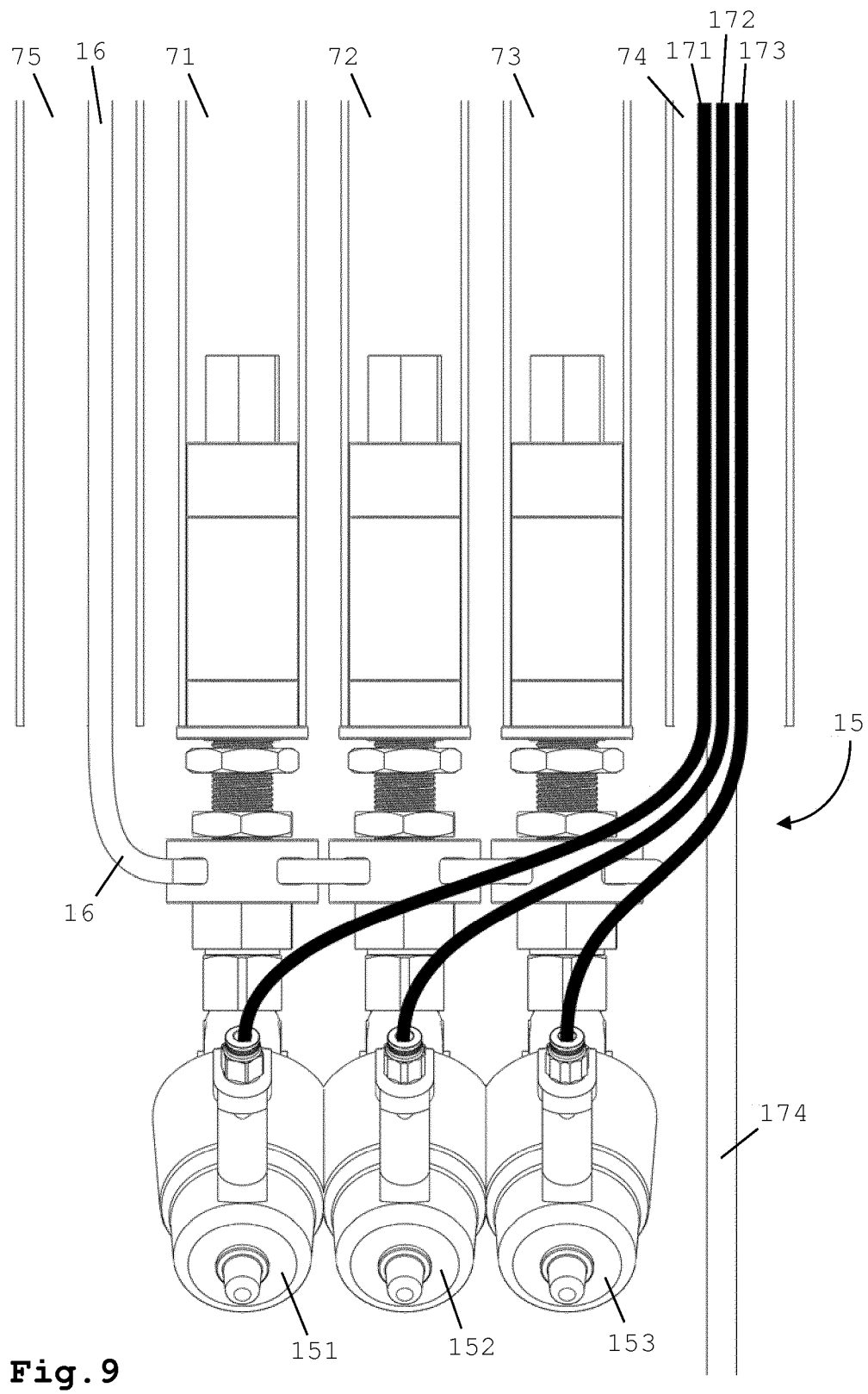
FIG. 9 shows a side view of a second connector device installed on tubes.

An exemplary embodiment of a second connector device 15 is shown in FIGS. 8 and 9, FIG. 8 being a perspective view and FIG. 9 being a side view. In this example the second connector device 15 is used for pressurizing three cleaned reactor tubes 71-73 using pressurized air. The air is for example provided under a pressure of 12 bar via valves 151-153. The second connector device 15 may include an insertion part that is inserted into the tube and which is fixed to a threaded tube end using nuts for each of the tubes. Alternatively, any other known connection mechanism for tube ends may be used. On the other end of the insertion part the valves 151-153 may be connected using any known connection mechanism, e.g. using air sealing nuts as shown in FIG. 8.

A fourth cleaned reactor tube 74 may be used for guiding control conduits, for example pneumatic conduits or electrical conduits, from the air lance unit 10 to each of the valves 151-153. This enables the air lance unit 10 or a person operating the air lance unit 10 to control the air pressure for each of the lances 111-113 depending on the air pressure needed to loosen the particles inside the to be cleaned reactor tubes 6. A main air pressure supply may be provided from a pump (not shown) to the air lance unit 10 via a conduit 174, such as shown in FIG. 9. Each of the control conduits 171-173 may then be used for providing a controlled air pressure from the air lance unit 10 to one or more of the valves 151-153.

With reference to FIGS. 6-9, a fifth cleaned reactor tube 75 may be used to guide a security cable 16, for example a steel cable, from the first connector device 14 to the second connector device 15. The security cable is typically connected to the pressurized parts of the connector devices and secures the first connector device 14 to the second connector device 15 as a safeguard in case one of the pressurized parts break loose.

The invention is not limited to the embodiments shown in the drawings. For example, the unloading process may be performed from the lower tube sheet 5 instead of the upper tube sheet 4. In this case the air lance unit 10, air lance 11, flexible guide tube 12, and first connector device 14 are located at the lower tube sheet 5 and the second connector device is located at the upper tube sheet 4. The air lance unit is then adapted to be fixable to the lower tube sheet 5.

The number of reactor tubes that can be unloaded simultaneously can be different from the shown examples. The shape of the catalyst reactor 1, domes 2 and 3 and tube sheets 4 and 5 are to be understood as non-limiting examples.

The invention claimed is:

1. A device for unloading particulate material from a reactor tube of a catalytic reactor comprising an array of substantially vertically aligned reactor tubes, the device comprising:
    an air lance for loosening the particulate material inside the reactor tube using pressurized air;
    an air lance unit for feeding the air lance in and out of the reactor tube; and
    a flexible guide tube on one end releasably connected to the air lance unit and on the other end connectable to a first cleaned reactor tube for guiding the air lance from the reactor tube via the air lance unit to the first cleaned reactor tube for storing a part of the air lance that has not been fed into the reactor tube within the first cleaned reactor tube, wherein the first cleaned reactor tube is a reactor tube that has been unloaded and/or cleaned prior to unloading the particulate material from the reactor tube.

2. The device according to claim 1, further comprising a vacuum system connectable via a vacuum hose to the air lance unit for vacuuming the particulate material from the reactor tube.

3. The device according to claim 1, further comprising a first connector device fixable to one end of the first cleaned reactor tube, and wherein the flexible guide tube is connectable to the first cleaned reactor tube via the first connector device.

4. The device according to claim 3, further comprising a second connector device fixable to the other end of the first cleaned reactor tube, the second connector device comprising a valve for providing the pressurized air to the air lance via the first cleaned reactor tube.

5. The device according to claim 4, further comprising a security cable for connecting the first connector device with the second connector device via a second cleaned reactor tube.

6. The device according to claim 3, further comprising a control conduit between the valve and the air lance unit for controlling a valve, wherein the first connector device and a second connector device are arranged to guide the control conduit through a third cleaned reactor tube.

7. The device according to claim 1, comprising:
    a plurality of air lances for simultaneously loosening particulate material inside a plurality of reactor tubes using pressurized air, wherein said air lance unit is arranged for feeding the plurality of air lances in and out of the plurality of reactor tubes, respectively; and
    a plurality of flexible guide tubes on one end connectable to said air lance unit and on the other end connectable to a plurality of cleaned reactor tubes for guiding the plurality of air lances from the plurality of reactor tubes to the plurality of cleaned reactor tubes, respectively, for storing respective parts of the plurality of air lances that have not been fed into the plurality of reactor tubes within the plurality of cleaned reactor tubes.

8. The device according to claim 7, wherein the plurality of reactor tubes are adjacent reactor tubes and wherein the plurality of cleaned reactor tubes are adjacent reactor tubes.

9. The device according to claim 1, wherein the air lance unit and the flexible guide tube are arranged to be used on a upper tube sheet of the catalytic reactor.

10. An air lance unit for use in a device according to claim 1, wherein the air lance unit is arranged for:
    feeding one end of an air lance in and out of a reactor tube; and
    feeding another end of the air lance in and out of a cleaned reactor tube via a flexible guide tube that is on one end releasably connected to the air lance unit and on the other end connectable to the cleaned reactor tube for guiding the air lance from the reactor tube via the air lance unit to the first cleaned reactor tube.

11. The air lance unit according to claim 10, arranged to detect obstructions in the reactor tube from a detected resistance when feeding the air lance into the reactor tube, and in response adjust a feeding force, adjust an air pressure of the pressurized air, adjust a vacuuming force and/or stop the unloading for one or more of the reactor tubes.

12. The air lance unit according to claim 10, further comprising a laser guide system for projecting a laser line onto further reactor tubes laterally located on two opposite sides of the air lance unit and aligned with reactor tubes to be unloaded by the air lance unit.

13. A method for unloading particulate material from a reactor tube of a catalytic reactor using a device according to claim 1, the method comprising:
   feeding the air lance from the first cleaned reactor tube into the reactor tube while the air lance unit is placed over the reactor tube;
   feeding the air lance from the reactor tube to the first cleaned reactor tube while the air lance unit is placed over the reactor tube;
   moving the air lance unit resulting in the air lance unit to be placed over a further reactor tube from which particulate material is to be unloaded;
   feeding the air lance from the first cleaned reactor tube into the further reactor tube while the air lance unit is placed over the further reactor tube; and
   feeding the air lance from the further reactor tube to the first cleaned reactor tube while the air lance unit is placed over the further reactor tube, wherein the first cleaned reactor tube is a reactor tube that has been unloaded and/or cleaned prior to unloading the particulate material from the reactor tube.

14. The method according to claim 13, wherein the array of substantially vertically aligned reactor tubes is divided into two or more sections, wherein the reactor tube and the further reactor tube are located in a first of the two or more sections, and wherein the first cleaned reactor tube is located in a second of the two or more sections.

15. The method according to claim 14, wherein the two or more sections are four quadrants.

16. The method according to claim 14, wherein two or more sections are processed simultaneously using two or more air lance units.

* * * * *